United States Patent Office 3,421,937
Patented Jan. 14, 1969

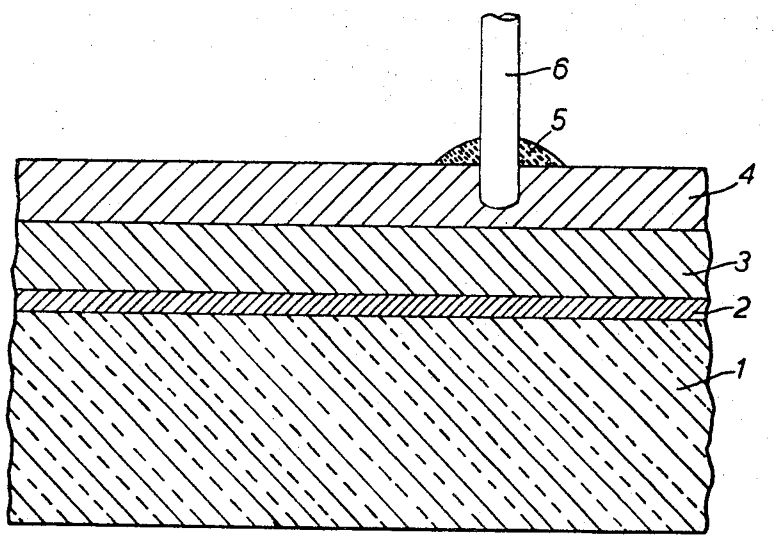
6
5
4
3
2
1

3,421,937

ELECTRICALLY CONDUCTIVE SOLDERABLE METALLIC COATINGS ON NON-METALLIC BASES

Peter Rheinberger, Vaduz, and Fritz Kümmerer, Triesen, Liechtenstein, assignors to Balzers Patent- und Lizenz-Anstalt, Balzers, Liechtenstein Filed Nov. 30, 1964, Ser. No. 414,767
Claims priority, application Switzerland, Dec. 2, 1963, 14,680/63
U.S. Cl. 117—217 3 Claims
Int. Cl. C23c 17/00

ABSTRACT OF THE DISCLOSURE

The production of a firmly adhering electrically conductive solderable metallic coating on a solid inorganic non-metallic carrier body, comprising the steps of preheating said carrier body to a temperature of at least 200° C., firstly thermally depositing from the vapor phase in an oxidizing atmosphere of pressure of about $10^{-4}$ mm. Hg at least one of the metals selected from the group consisting of nickel, cobalt and manganese on said carrier body, secondly thermally depositing from the vapor phase in a high vacuum of about $10^{-6}$ mm. Hg a layer of a solder on said preceding layers.

The present invention relates to the production of firmly adhering electrically conductive solderable metallic coatings on solid inorganic non-metallic carrier bodies.

Coatings capable of being soldered on bodies like glass, ceramics or similar materials are known to be needed for the fixed connection of these bodies with other bodies, e.g. with metal components of electronics, for the production of X-ray tubes, transmitter tubes, vacuum-tight current conductor lead-ins or the like. Firmly adhering solderable metal coatings on isolating bases have also gained importance in modern electronics for the production of so-called printed or etched circuits.

It is known that one may apply on a non-metallic solid carrier body firstly a metal layer by the so-called burning-in method, that this layer can be galvanically reinforced by another metal and that eventually also the solder may be applied galvanically, in order to obtain a solderable coating for the production of vacuum-tight connections between metal components. It has also been proposed to apply such layers by deposition from the vapor phase, said vapor phase deposition allowing in general a more uniform distribution. Moreover in the mass production of comparatively small articles the vapor phase deposition is often more economical.

While as regards the production by the burning-in method many data of tried-out metal combinations and of the optimum conditions for production are available from experience, there still prevailed uncertainty as regards the production by the vapor phase deposition method. It is known that thin layers of metal oxides deposited from the vapor phase may serve as so-called adhesion layers or metal layers to be subsequently deposited thereon from the vapour phase. For example it has been proposed to use silicon monoxide layers as adhesion layers for aluminum layers, and likewise to use the oxides of lead, silver, aluminum, magnesium, zirconium or the rare-earth metals as adhesion layers for subsequently deposited metal layers. Adhesion layers of pure metals have also been tried, e.g. adhesion layers of chromium deposited from the vapor phase for subsequently deposited layers of copper.

Experience has shown, that in general for a certain base quite a definite adhesion layer substance has to be found; that the same has moreover to be deposited by quite a definite method, that when depositing e.g. from the vapor phase in vacuo the conditions as regards pressure and composition of the residual gas, the temperature rate of deposition etc. have to be kept accurately, when a good result has to be attained.

The present invention has the main object of providing a method for the production of a firmly adhering electrically conductive and solderable metal coating on carrier bodies such as glass or ceramics, porcelain or similar materials by deposition from the vapor phase, and constitutes a novel combination of process steps and of layer materials known per se. With these and other objects in view, which will become apparent later from this specification, we provide a method for the production of a firmly adhering electrically conductive solderable metallic coating on a solid inorganic non-metallic carrier body, comprising the steps of preheating said carrier body to a temperature of at least 200° C., firstly thermally depositing from the vapor phase in an oxidizing atmosphere at least one of the metals selected from the group consisting of nickel, cobalt and manganese on said carrier body, secondly thermally depositing from the vapor phase in a high vacuum a layer of copper and thirdly thermally depositing from the vapor phase in a high vacuum a layer of a solder on said preceding layers. This method produces e.g. on glass, porcelain and oxidic sintered bodies, such as those used in the art of electronics as insulating moulded bodies, surprisingly firmly adhering solderable coatings. As solder layers, particularly tin and silver are suitable for two different temperature ranges.

It is important that the solder layer should be likewise deposited from the vapor phase; soldering merely on the copper layers does not lead to the good results desired. The thickness of the layers is not critical; in general it is advisable to select the first layer very thin (still permeable to light), and to apply the copper layer at such a thickness, as required for the soldering operation provided. Copper layers thicker than some $\mu$ should not be deposited, and the same applies to the solder layers.

On a glass plate heated to about 250° C., firstly, accordingly to the method of the present invention a nickel layer of about 100 A. thickness has been deposited from the vapor phase in a pure oxygen atmosphere at a pressure of about $10^{-4}$ mm. Hg, and subsequently in a high vacuum of about $10^{-6}$ mm. Hg a copper layer of about $1\mu$ thickness and thereafter a tin layer of the same thickness have been deposited from the vapor phase. On such glass plates finally, for test purposes, copper wires of 0.5 mm. to 2 mm. diameter were soldered by means of a soldering iron. Such a glass plate with a wire soldered on was placed on two parallel edges (the gap of a vise), which supported the glass plate laterally near the soldering joint, and it was tried to pull the wire off.

It then regularly occurred that either the wire itself snapped, or that at a tensile force of 30 kg. applied to the wire the glass broke. One succeeded in this manner even in tearing holes out of a glass plate of 2 mm. thickness. (Preliminary measurements had the result that an adhesion strength of at least 100 kg. per $cm.^2$ can be attained).

The end of a porcelain tube was provided with a solderable coating by the method according to the invention, and then this tube was soldered to a metal flange. This connection was tested for vacuum tightness. With a test vacuum of $10^{-9}$ mm. Hg no leakage could be found by means of a helium leakage testing instrument (mass spectrometer).

Both these aforesaid tests demonstrate the technical progress attained by the invention. Such mechanically strong and at the same time vacuum-tight connections between metallic and non-metallic components offer numerous possibilities of application.

An embodiment of a solid inorganic non-metallic carrier body with three consecutive layers applied to it by the method according to the invention is illustrated by way of example in the accompanying drawing which is a section on a greatly enlarged scale, in which the comparative thicknesses of the carrier body and of the layers deposited thereon are not in the exact ratio they have in nature.

In the drawing, on a glass base 1 a first layer of nickel is deposited from the vapor phase in an oxygen atmosphere, the thickness of this layer being of the order of magnitude of 100 Angström units. A second layer 3 of copper and a third layer 4 of tin are both deposited from the vapor phase in a vacuum, and the thicknes of each of them is of the order of magnitude of 1 micron. At a soldering point 5 a wire 6 is soldered to the solder layer 4. While we have herein described and illustrated in the accompanying drawing what may be considered typical and particularly useful embodiments of our said invention, we wish it to be understood, that we do not limit ourselves to the particular details and dimensions described or illustrated; for obvious modifications will occur to a person skilled in the art.

What we claim as our invention and desire to secure by Letters Patent, is:

1. A method for the production of a firmly adhering electrically conductive solderable metallic coating on a solid inorganic non-metallic carrier body, comprising the steps of preheating said carrier bdoy to a temperature of at least 200° C., firstly thermally depositing from the vapor phase in an oxidizing atmosphere of a pressure of about $10^{-4}$ mm. Hg and at least one of the metals selected from the group consisting of nickel, cobalt and manganese on said carrier body, secondly thermally depositing from the vapor phase in a high vacuum of about $10^{-6}$ mm. Hg a layer of copper, and thirdly thermally depositing from the vapor phase in a high vacum of about $10^{-6}$ mm. Hg a layer of a material selected from the group consisting of silver and tin on said preceding layers.

2. A method as claimed in claim 1, wherein said carrier body consists of glass.

3. A method as claimed in claim 1, wherein said carrier body consists of a ceramic.

References Cited

UNITED STATES PATENTS 2,628,927 2/1953 Colbert et al. ------ 117—217 X
3,253,331 5/1966 Limansky.

ALFRED L. LEAVITT, *Primary Examiner.*

A. GOLIAN, *Assistant Examiner.*

U.S. Cl. X.R.

117—106, 229